United States Patent [19]

Kitamura et al.

[11] Patent Number: 5,018,962
[45] Date of Patent: May 28, 1991

[54] INJECTION MOLDING DIE APPARATUS FOR USE IN THE PRODUCTION OF SUBSTRATE OF OPTICAL DISK

[75] Inventors: Takehiko Kitamura, Chiba; Hirosato Amano, Numazu; Masaharu Kaita, Kamagaya, all of Japan

[73] Assignee: Sumitomo Heavy Industries, Ltd., Tokyo, Japan

[21] Appl. No.: 409,898

[22] Filed: Sep. 20, 1989

[30] Foreign Application Priority Data

Sep. 30, 1988 [JP] Japan .................... 63-248616

[51] Int. Cl.⁵ .......................... B29C 45/40
[52] U.S. Cl. ...................... 425/556; 425/810
[58] Field of Search ............ 425/810, 556, 810

[56] References Cited

U.S. PATENT DOCUMENTS

| | | | |
|---|---|---|---|
| 4,707,321 | 11/1987 | Segawa et al. | 425/810 |
| 4,772,196 | 9/1988 | Asai | 425/810 |
| 4,789,320 | 12/1988 | Sasamura et al. | 425/810 |
| 4,879,082 | 11/1989 | Kudo et al. | 425/810 |

FOREIGN PATENT DOCUMENTS 59-5017 1/1984 Japan .

Primary Examiner—Willard E. Hoag
Attorney, Agent, or Firm—Armstrong, Nikaido, Marmelstein, Kubovcik, & Murray

[57] ABSTRACT

An injection molding die apparatus for use in the production of an optical disk substrate has a stationary die part having a mirror-finished surface, a movable die part carrying a stamper, an outer peripheral ring slidably fitting on the outer periphery of the movable die part and contactable with the stationary die part when the movable die part has been moved close to the stationary die part, such that a die cavity to be charged with injected molten plastic is formed by the mirror surface of the stationary die part, the stamper and the outer peripheral ring. First and second ejection mechanisms are provided to push the injection-molded optical disk substrate away from the stamper simultaneously both at the central portion and outer peripheral portion of the optical disk substrate, while the optical disk substrate is held in close contact with the mirror-finished surface of the stationary die part, whereby the separation of the injection-molded optical disk substrate from the stamper takes place uniformly without distortion and failure in the transfer of the track grooves.

2 Claims, 3 Drawing Sheets

INJECTION MOLDING DIE APPARATUS FOR USE IN THE PRODUCTION OF SUBSTRATE OF OPTICAL DISK

BACKGROUND OF THE INVENTION

1. Field of the Invention

The present invention relates to an injection molding die apparatus for use in the production of a substrate of an optical disk. More particularly, the present invention is concerned with an injection molding die which enables a uniform separation of an optical disk substrate from a stamper on the die after injection molding of the substrate.

2. Description of the Related Art

In general, an optical disk has a substrate which is formed from a plastic material by injection molding. Injection molding of the substrate of an information recording medium of this kind usually employs a stamper which is provided in the injection molding die so that information recording tracks are transferred to the substrate from the stamper simultaneously with the formation of the substrate. After the formation of the substrate and the transfer of the track grooves, the substrate is separated from the stamper. The separation has to be conducted with greatest care in order to avoid any damage of the track grooves so as to ensure that the track grooves can function satisfactorily, and various proposals have been made to enable safe separation of the substrate.

FIG. 4 shows an example of a known injection molding die for use in the production of an optical disk substrate. The injection molding die has a stamper 1 fixed to a movable die part 2 which is adapted to be moved towards a stationary die part (not shown). A molten plastic material is injected into a space defined by the stationary die part, stamper 1 and an outer peripheral ring 3 provided on the outer periphery of the stamper 1, whereby a substrate 4 of optical disk is formed. A through-hole 5 is formed in the center of the movable die part 2 such that the axis of the through hole 5 extends in the direction of movement of the movable die part 2. The through-hole 5 loosely receives a sleeve-like ejector member 6 connected to an actuator (not shown). After the injection molding of the substrate 4 of the optical disk, the movable die part 2 is moved away from the stationary die part for the purpose of parting. In consequence, the optical disk substrate 4 is separated from the stationary die while being held in close contact with the stamper 1. At the same time, the ejector member 6 is projected from the stamper 1 so as to push the central portion of the optical disk substrate 4 held in close contact with the stamper 1, thereby separating the optical disk substrate 4 from the stamper 1. In addition, air is introduced into the space between the optical disk substrate 4 and the stamper 1 through an annular air slit 7 formed between the ejector member 6 and the through-hole 5 which loosely receives the ejector member 6, thereby completely separating the optical disk substrate 4 from the stamper 1. Although the separation in the illustrated case is conducted by cooperation of the mechanical action of the ejector member 6 and the pneumatic force produced by the air, the ejector member 6 is omitted in some known apparatus so that the separation is conducted solely by the flow of air introduced through the air slit 7. Referring to FIG. 4, a rod 6a is inserted into the sleeve-like ejector member 6. Namely, only the portion of the ejector member 6 contactable with the optical disk substrate 4 has a cylindrical form.

Thus, in the known injection molding die for use in the production of an optical disk substrate, the optical disk substrate 4 formed by injection molding, still held in close contact with the stamper 1 held by the movable die part 2, is first separated from the stationary die part and then separated from the stamper by the cooperation between the mechanical action of the ejector member 6 and the pneumatic force produced by the air introduced through the slit or by such a pneumatic force a alone. Thus, the separation of the optical disk substrate takes place first at the center of the optical disk substrate 4 and progressively propagates to peripheral regions. This known separation technique tends to cause problems such that the track grooves left after the separation are irregularly deformed or the optical disk substrate 4 itself is distorted, with the result that the performance of the optical disk as a product is undesirably impaired.

More specifically, when the optical disk substrate 4 which is still hot is separated from the stationary die part, only the surface which has been held in contact with the stationary die part is rapidly cooled due to contact with air and is contracted with the result that the optical disk substrate 4 is deflected such that the central region of the optical disk substrate 4 is convexed towards the stamper 1 with the peripheral portions of the optical disk substrate 4 quickly separated from the stamper 1. Subsequently, parting force is applied by the ejector member 6 and the compressed air supplied through the air slit 7 to the central portion of the optical disk substrate 4 so that the central portion of the optical disk substrate 4 is recessed away from the stamper 1 with radially intermediate portion of the substrate 4 convexed towards the stamper 1. In consequence, slight radial displacement of the optical disk substrate 4 is caused relative to the stamper 1 with the result that the transferred track grooves are deformed in a manner shown in FIGS. 5 and 6. Referring to these figures, numeral 8 denotes minute pits transferred from the stamper 1 to the track surface 4a of the optical disk substrate 4. The pits 8 are formed at a predetermined pitch in the region of the track surface 4a between adjacent circumferential grooves 9 which are formed by the transfer. The above-mentioned radial displacement of the optical disk substrate 4 with respect to the stamper 1 at the time of separation causes that radial drags of the pits are formed as hatched in FIG. 5, thus leaving transfer failure portions 8a. Such transfer failure portions 8a may take place over the entire area of the track surface 4a. An optical disk having a substrate 4 involving such transfer failure exhibits inferior optical characteristics due to double refraction of a laser beam applied thereto. In addition, the deformation of the optical disk substrate 4 itself causes a predetermined allowable inclination of disk surface to be exceeded, result in degradation of performance of the optical disk.

SUMMARY OF THE INVENTION

Accordingly, an object of the present invention is to provide an injection molding die apparatus which is capable of preventing deformation of the formed optical disk substrate and eliminating transfer failure of track grooves, thereby offering improvement in the quality of the optical disk product while overcoming the above-described problems of the prior art.

To this end, according to the present invention, there is provided an injection molding die apparatus comprising: a stationary die part having a mirror-finished surface; a movable die part movable in an axial direction towards and away from the stationary die part and provided with a stamper fixed thereto; an outer peripheral ring having one end axially slidably fitting around the outer periphery of the movable die part, the outer peripheral ring being capable of making contact at its other end with the stationary die part when the movable die part has been moved close to the stationary die part, so as to form a die cavity in cooperation with the mirror-finished surface of the stationary die plate and the stamper on the movable die part, the die cavity being capable of receiving a molten plastic material injected thereto so that an optical disk substrate is formed by injection molding; a first ejection mechanism including a rod member extending through the center of the movable die part and through the center of the stamper such that the end of the rod serves as a portion of the stamper defining the cavity, the first ejection mechanism further including an actuating means for causing the rod member to project from the stamper in the axial direction; and a second ejection mechanism including pins fixed to the outer peripheral ring and projected towards the movable die part and elastic members supported by the movable die part and urging the outer peripheral ring towards the stationary die part in the axial direction through the pins; wherein, when the movable die part is moved away from the stationary die part after the injection molding, the end of the rod member of the movable die part is projected from the stamper so as to separate the central portion of the optical disk substrate which is held in close contact with the mirror-finished surface of the stationary die part and, at the same time, the outer peripheral ring is caused to move relative to the movable die part so as to be kept in contact with the stationary die part thereby to separate the outer peripheral portion of the optical disk substrate from the stamper.

The above and other objects, features and advantages of the present invention will become clear from the following description of the preferred embodiment when the same is read in conjunction with the accompanying drawings.

DESCRIPTION OF THE PREFERRED EMBODIMENT

Figure 1:
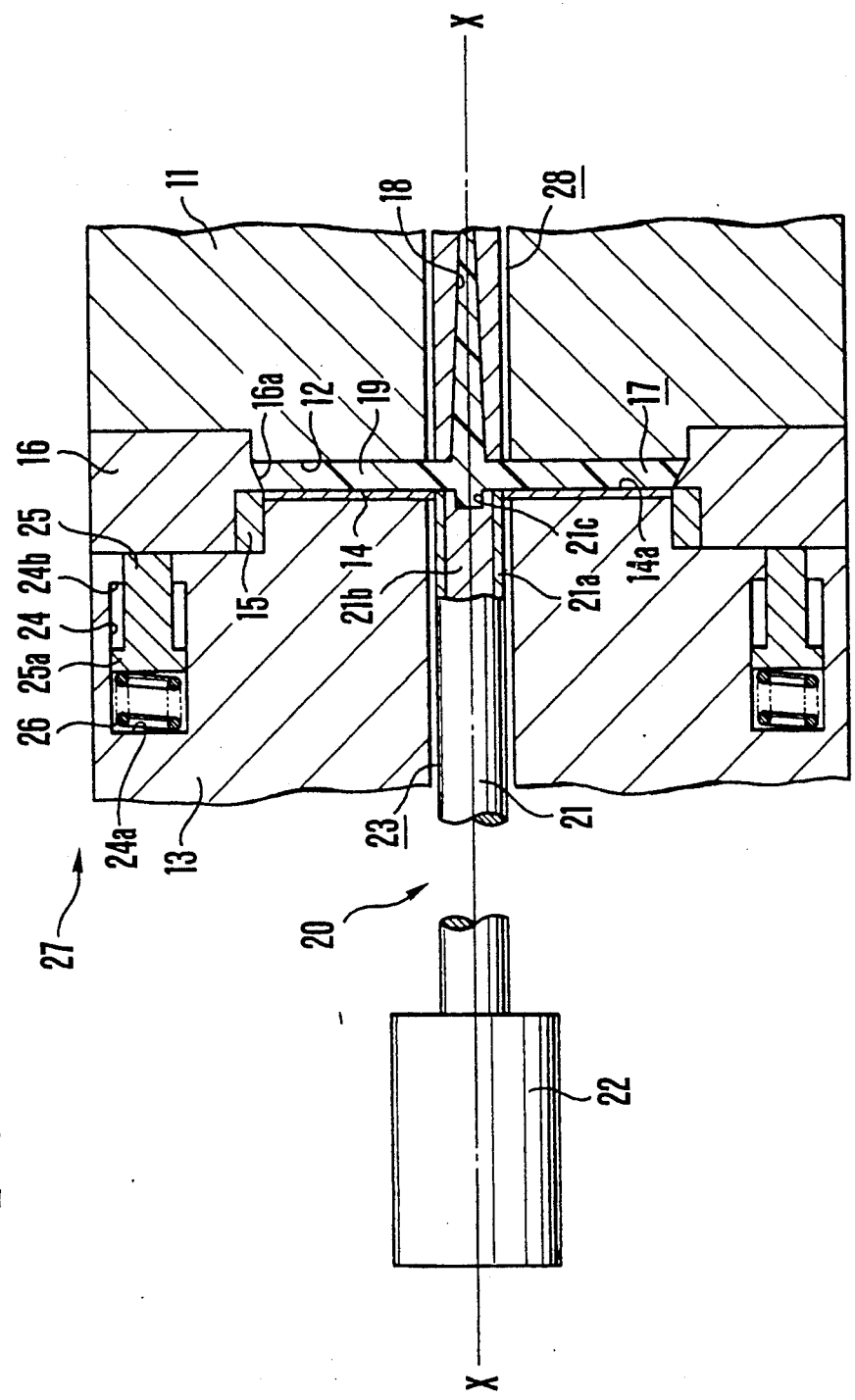
FIG. 1 is a sectional side elevational view of an embodiment of the injection molding die apparatus of the invention for use in the production of an optical disk substrate.
Figure 2:
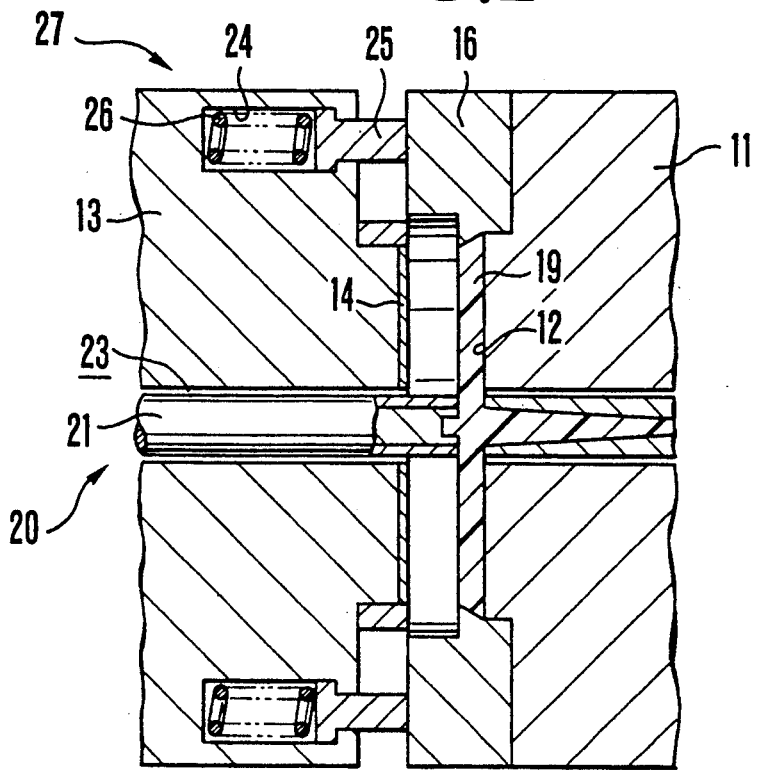
FIG. 2 is a sectional side elevational view of the embodiment of FIG. 1 in a state immediately after separation of a movable die part from a stationary die part.
Figure 3:
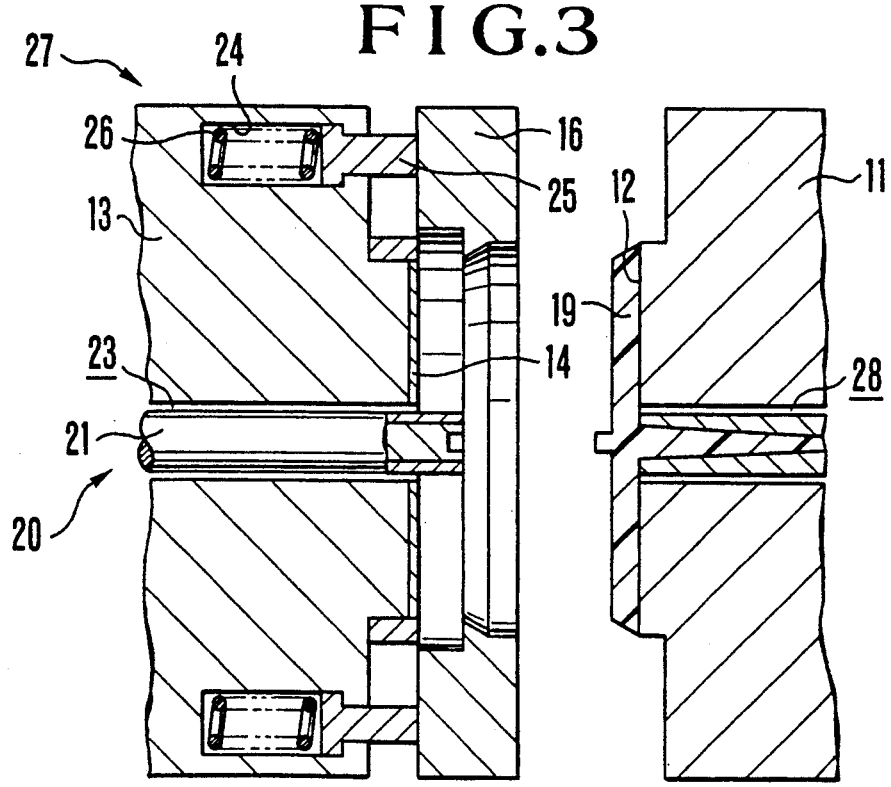
FIG. 3 is a sectional side elevational view of the embodiment of FIG. 1 in a state after complete separation of the movable die part from the stationary die part.
Figure 4:
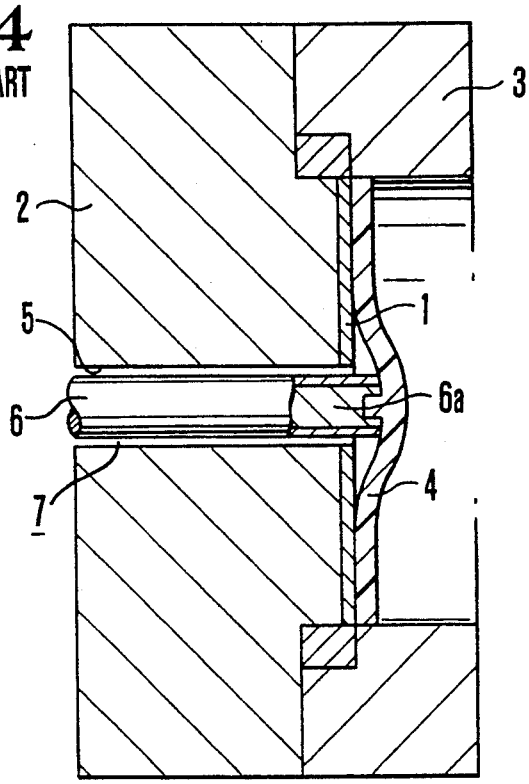
FIG. 4 is a sectional side elevational view of a known injection molding die apparatus for use in the production of an optical disk substrate.
Figure 5:
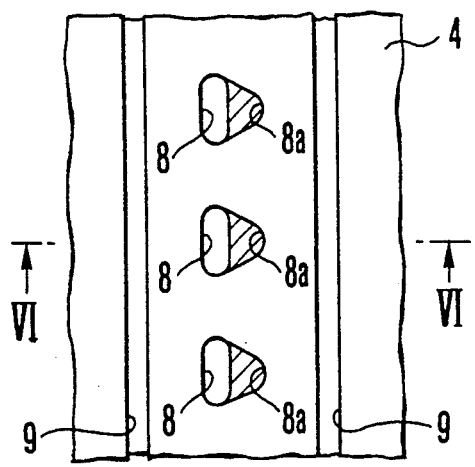
FIG. 5 is an enlarged plan view of an optical disk substrate illustrative of a transfer failure.
Figure 6:
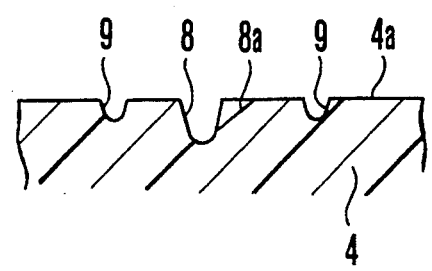
FIG. 6 is a sectional view taken along the line VI—VI of FIG. 5.

FIGS. 1 to 3 show an embodiment of the injection molding die apparatus of the invention for use in the production of an optical disk substrate.

Referring to these figures, an injection molding die apparatus of the present invention has a stationary die part 11 having a mirror-finished surface 12 and a movable die part 13 which is disposed to oppose the mirror-finished surface 12 of the stationary die part 11. Although not shown, an actuating mechanism used in ordinary die apparatus is connected to the movable die part 13 so as to drive the movable die part 13 in the direction of axis X—X towards and away from the stationary die part 11. A stamper 14 is attached to the stationary die part 11 facing the mirror-finished surface 12 of the stationary die part 11. More specifically, a ring-shaped stamper retainer 15, surrounding the stamper 14, is fixed to the movable die part 13 so that the stamper 14 is fixed to the movable die part 13 by means of the stamper retainer 15. A reference numeral 16 designates an outer peripheral ring and the inner peripheral end thereof on the left side as viewed in the figure fits on the outer periphery of the stamper retainer 15, such that the outer peripheral ring is secured to the movable die part 13 through the stamper retainer 15 movably in the direction of the axis X—X. The arrangement is such that the end of the outer peripheral ring 16 on the right side as viewed in the figure contacts the stationary die part 11 when the movable die 13 has approached the stationary die part 11. FIG. 1 shows the injection molding die apparatus in the closed state, i.e., in the state in which the movable die part 13 has been brought close to the stationary die part 11 to cause the outer peripheral ring 16 to contact with the stationary die part 11. Namely, in the state shown in FIG. 1, the injection molding die apparatus has been fully closed so that a cavity 17 is formed between the inner peripheral surface 16a of the outer ring 16, the mirror-finished surface 12 of the stationary mold part 11 and the stamper 14. A sprue 18 is formed in the stationary die part 11 along the axis X—X. The sprue 18 communicates at its one end with the cavity 17 while the other end is connected to an injection device (not shown). The injection device is capable of injecting a molten plastic into the cavity 17 through the sprue 18 so that a disk-shaped optical disk substrate 19 is formed. Simultaneously, minute protrusions formed on the transfer surface 14a of the stamper 14 adjacent to the cavity 17 are transferred by stamping to the optical disk substrate 19 thereby forming track grooves which are used in the recording of information.

A reference numeral 20 designates a first ejector mechanism provided on the movable die part 13. The first ejector mechanism 20 has a rod member 21 which extends through the center of the movable die part 13 and through the center of the stamper 14 fixed to the movable die part 13, and an actuator 22 fixed to the base end of a rod member 21. A ring-shaped slit 23 is formed between the rod member 21 and the assembly of the movable die part 13 and the stamper 14. The rod member 21 is composed of a sleeve 21a and a rod 21b integrally received in the sleeve 21a. The rod member 21 has one end which extends through the stamper 14 and serves as a portion of the stamper 14 defining the cavity 17 during injection of the optical disk substrate 19. The actuator 22 has, for example, a hydraulic cylinder or a pneumatic cylinder which is operated in response to a parting signal which is delivered by a control unit (not shown) to the aforementioned actuator of the die apparatus at the time of parting after the injection molding of the optical disk substrate 19, so as to project the rod member 21 in the direction of the axis X—X from the stamper 14 held by the movable die part 13 moved apart from the stationary die part 11. A recess 21c is formed in the end of the rod 21b of the rod member 21 so that, when the rod member 21 is projected, the end of the rod 21b together with the sleeve 21a presses a central ringlike area of the optical disk substrate 19. The control unit mentioned above is capable of delivering a die closing signal and a die parting signal to the actuator of the movable die parts 13 thereby causing the movable die part 13 to be moved towards and away from the stationary die part 11.

A plurality of cylinders parallel to the axis X—X are arranged around the movable die part 13 so as to oppose the outer peripheral ring 16. The cylinders 24 slidably receive pistons 25a to which are connected pins 25 which are fixed to the outer peripheral ring 16 and projectable towards the movable die part 13. A coiled spring 26 is loaded between the piston 25a connected to each pin 25 and the bottom (left end as viewed in the figure) of the cylinder 24. During injection molding of the optical disk substrate 19, the coiled spring 26 is compressed so as to urge the outer peripheral ring 16 in the direction of the axis X—X towards the stationary die part 11. Thus, the coiled springs 26 serve as elastic members which are supported by the movable die part 13 and which are capable of urging the outer peripheral ring 16 along the axis X—X towards the stationary die part 11. The pins 25 and the coiled springs 26 in cooperation provide a second ejection mechanism 27 which is one of the essential part of the present invention.

During parting, the movable die part 13 is moved away from the stationary die part 11 while the pins 25 are moved towards the stationary die part 11 by the force of the coiled springs 26 so that the pistons 25a connected to the pins 25 are brought into contact with the right bottom surfaces 24b of the cylinder 24 so as to stop the outer peripheral ring 16. In consequence, the outer peripheral ring is moved relatively to the movable die part 13 towards the stationary die part 11 in contact therewith and, after the movable die part 13 has been moved by a predetermined distance, the outer peripheral ring 16 is separated from the stationary die part 11. Reference numeral 28 denotes an annular air slit formed around the sprue 18 so as to extend along the axis X—X. The air slit 28 opens at its one end to the cavity 17 while the other end is connected to a compression air source (not shown).

The operation of this embodiment will be described with reference to FIGS. 2 and 3 which show the injection molding die apparatus showing progressive states in which the movable die part 13 is separated and moved away from the stationary die part 11 and an optical disk substrate 19 is separated from the stamper 14.

Referring to FIG. 1, the actuator (not shown) of the die apparatus has been driven in response to a die closing signal from a control unit so that the movable die part 13 has been brought close to the stationary die part 11, with the cavity 17 formed by the mirror-finished surface 12 of the stationary die part 11, transfer surface 14a of the stamper 14 and the outer peripheral ring 16 as explained before. Then, a molten plastic is injected into the cavity 17 from the injection device (not shown) through the sprue 18 to fill the die cavity 17, whereby a disk-shaped optical disk substrate 19 is formed. In this state, the optical disk substrate 19 is held in close contact with the stationary die part 11 because the mirror-finished surface 12 of the stationary die part exhibits a strong cohesion force. At the same time, the track grooves are transferred from the transfer surface 14a of the stamper 14 to the surface of the optical disk substrate 19 facing the stamper 14. In this state, the pins 25 and the rods 21 have been retracted towards the movable die part 13.

After the injection molding of the optical disk 19, the movable die part 13 is separated from the stationary die part 11 in accordance with a die opening signal from the control unit. The die opening signal also causes the actuator 22 of the first ejection mechanism 20 to operate so that the end of the rod 21 is projected from the center of the stamper 14 so as to press the central portion of the optical disk substrate 19 which is held in close contact with the mirror-finished surface 12 of the stationary die part 11, whereby the central portion of the molded optical disk substrate 19 is separated from the stamper 14.

On the other hand, simultaneously with the start of movement of the movable die part 13 away from the stationary die part 11, the second ejection mechanism 27 operates to move the outer peripheral ring 16 while keeping it in contact with the stationary die part 11 through the pins 25 urged by the force of the coiled springs 26, thereby to separate the outer peripheral portion of the optical disk substrate 19 from the stamper 14. Thus, the optical disk substrate 19 is pressed simultaneously both at the central portion and the outer peripheral portion thereof by the operation of the first and second ejection mechanisms 20 and 27. In addition, the optical disk substrate 19 is held in contact with the mirror-finished surface 12 due to large cohesion exhibited by the mirror-finished surface 12. For these reasons, the separation of the optical disk substrate 19 from the stamper 14 takes place uniformly over the entire area of the optical disk substrate 19, thus eliminating any distortion of the optical disk substrate 19, as well as transfer failure of the track grooves. Furthermore, since the optical disk substrate 19 is held in close contact with the mirror-finished surface 12, the optical disk substrate 19 is maintained substantially at the same temperature as the die part. After the separation of the die parts, the surface of the optical disk substrate 19 adjacent to the stamper 14 is opened to air so as to be cooled by the air, tending to cause a contraction of this surface and a consequent distortion of the optical disk substrate 19. This tendency, however, is suppressed by virtue of the fact that the first and the second ejection mechanisms 20 and 27 press the optical disk substrate 19 to keep it in contact with the stationary die part 11. The separation of the optical disk substrate 19 from the stamper 14 may be effected with introduction of compressed air into the gap between the optical disk substrate 19 and the stamper 14 through the annular slit 23 between the movable die part 13 and the rod 21 so as to further ensure that the separation is performed uniformly over the entire area.

As will be understood from FIG. 3, during further movement of the movable die part 13 away from the stationary die part 11, the movement of the outer peripheral ring 16 and the projection of the rod 21 are ceased and the outer peripheral ring 16 and the rod 21 are separated from the optical disk substrate 19, whereby the movable die part 13 is completely separated from the stationary die part 11 and the optical disk substrate 19 is freed from the movable die part 13. Subsequently, compressed air is supplied into a minute gap between the optical disk substrate 19 and the mirror-finished surface 12 of the stationary die part 11 from the compressed air source through the air slit 28 formed in the stationary die part 11, thereby separating the optical disk substrate 19 from the stationary die part 11. Then, the optical disk substrate 19 is picked up out of the space between both die parts 11, 13 by a suitable mechanism which is not shown, whereby the operation for forming the optical disk substrate 19 is completed.

As has been described, according to the present invention, the optical disk substrate 19 can be uniformly separated from the stamper 14 while it is held in close contact with the mirror-finished surface 12 of the stationary die part 11 when the movable die part 13 is separated and moved away from the stationary die part 11.

It is therefore possible to avoid undesirable distortion of the optical disk substrate 19 and any transfer failure of the track grooves which are often encountered during separation of the optical disk substrate from a stamper in conventional injection molding die apparatus.

Thus, in the injection molding die apparatus of the present invention, the stationary die part is provided with a mirror-finished surface, and first and second ejection mechanisms are provided to simultaneously separate both the central portion and outer peripheral portion of the optical disk substrate. Therefore, the optical disk substrate can be separated from the stamper uniformly by the action of both ejection mechanisms while kept in close contact with the mirror-finished surface of the stationary die part. It is therefore possible to prevent any undesirable distortion of the optical disk substrate and transfer failure of the track grooves from the stamper, thereby contributing to improvement in the performance of the optical disk product.

What is claimed is:

1. An injection molding die apparatus comprising:
    a stationary die part having a mirror-finished surface;
    a movable die part movable in an axial direction towards and away from said stationary die part and provided with a stamper fixed thereto;
    an outer peripheral ring having one end axially slidably fitting around the outer periphery of said movable die part, said outer peripheral ring being capable of making contact at its other end with said stationary die part when said movable die part has been moved close to said stationary die part, so as to form a die cavity in cooperation with said mirror-finished surface of said stationary die plate and said stamper on said movable die part, said die cavity being capable of receiving a molten plastic material injected thereto so that an optical disk substrate is formed by injection molding;
    a first ejection mechanism including a rod member extending through the center of said movable die part and through the center of said stamper such that the end of said rod serves as a portion of said stamper defining said cavity, said first ejection mechanism further including an actuating means for causing said rod member to project from said stamper in the axial direction; and
    a second ejection mechanism including pins fixed to said outer peripheral ring and projected towards said movable die part and elastic members supported by said movable die part and positioned to press said pins against said outer peripheral ring to urge the ring towards said stationary die part in the axial direction through said pins;
    wherein, when said movable die part is moved away from said stationary die part after the injection molding, the end of said rod member of said movable die part is projected from said stamper so as to separate the central portion of said optical disk substrate which is held in close contact with said mirror-finished surface of said stationary die part and, at the same time, said outer peripheral ring is caused to move relative to said movable die part so as to be kept in contact with said stationary die part thereby to separate the outer peripheral portion of said optical disk substrate from said stamper.

2. An injection molding die apparatus as claimed in claim 1, wherein said outer peripheral ring has a surface which defines the outer peripheral end of said cavity and which is conically shaped so as to diverge towards said stationary die part.

* * * * *